US012597845B2

(12) United States Patent
Sun et al.

(10) Patent No.: US 12,597,845 B2
(45) Date of Patent: Apr. 7, 2026

(54) PHOTOVOLTAIC SYSTEM HAVING MASTER AND SLAVE CONVERTERS AND CONTROL METHOD OF THE SAME

(71) Applicant: Sungrow Power Supply Co., Ltd., Hefei (CN)

(72) Inventors: Shuai Sun, Hefei (CN); Anran He, Hefei (CN); Peng Chen, Hefei (CN); Zhicheng Wang, Hefei (CN); Xuebing Chen, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 192 days.

(21) Appl. No.: 18/579,630

(22) PCT Filed: Apr. 24, 2022

(86) PCT No.: PCT/CN2022/088674
§ 371 (c)(1),
(2) Date: Jan. 16, 2024

(87) PCT Pub. No.: WO2023/077741
PCT Pub. Date: May 11, 2023

(65) Prior Publication Data
US 2024/0339921 A1 Oct. 10, 2024

(30) Foreign Application Priority Data

Nov. 5, 2021 (CN) .......................... 202111308573.7

(51) Int. Cl.
*H02M 1/00* (2007.01)
*H02J 3/38* (2006.01)
(Continued)

(52) U.S. Cl.
CPC ....... *H02M 1/0074* (2021.05); *H02M 1/0077* (2021.05); *H02S 40/32* (2014.12)

(58) Field of Classification Search
CPC .. H02M 1/007; H02M 1/0074; H02M 1/0077; H02M 1/0093; H02J 3/381; H02J 2300/24; H02J 2300/26; H02J 3/46
See application file for complete search history.

(56) References Cited

U.S. PATENT DOCUMENTS

| | | | | |
|---|---|---|---|---|
| 8,212,408 B2 * | 7/2012 | Fishman | ............... | H02M 7/493 |
| | | | | 307/77 |
| 8,427,010 B2 * | 4/2013 | Bose | ..................... | H02M 7/487 |
| | | | | 307/82 |

(Continued)

FOREIGN PATENT DOCUMENTS

| | | |
|---|---|---|
| CN | 110190741 A | 8/2019 |
| CN | 112928940 A | 6/2021 |

(Continued)

OTHER PUBLICATIONS

First Office Action for Japanese Application No. 2024-202220, mailed Dec. 24, 2024.

(Continued)

*Primary Examiner* — Sisay G Tiku
(74) *Attorney, Agent, or Firm* — Wolf, Greenfield & Sacks, P.C.

(57) ABSTRACT

A photovoltaic system and a control method. The photovoltaic system includes a master DC/DC converter; a slave DC/DC converter; a master DC/AC converter; and a slave DC/AC converter. The master DC/AC converter is configured to send a current instruction value and an input voltage of the master DC/AC converter to the slave DC/AC converter; and the slave DC/AC converter is configured to control an output current, based on an input voltage of the slave DC/AC converter, the current instruction value, and the input voltage of the master DC/AC converter, so that a current through the N wire is less than a preset current.

20 Claims, 2 Drawing Sheets

(51) Int. Cl.
  *H02J 3/46* (2006.01)
  *H02S 40/32* (2014.01)

(56) References Cited

U.S. PATENT DOCUMENTS

| | | | | | |
|---|---|---|---|---|---|
| 2008/0278968 | A1* | 11/2008 | Srinivasan | ............ | H02M 7/497 |
| | | | | | 307/77 |
| 2008/0280175 | A1* | 11/2008 | Gurunathan | .......... | H02M 7/497 |
| | | | | | 429/432 |
| 2010/0013317 | A1* | 1/2010 | Ballantine | ............... | H02J 1/102 |
| | | | | | 307/82 |
| 2010/0195361 | A1* | 8/2010 | Stem | ................... | H02M 7/5387 |
| | | | | | 363/132 |
| 2011/0241433 | A1* | 10/2011 | Sihler | ....................... | H02J 3/46 |
| | | | | | 307/82 |
| 2015/0244166 | A1* | 8/2015 | Chen | ....................... | H02M 3/24 |
| | | | | | 363/37 |
| 2017/0047741 | A1 | 2/2017 | Narla | | |
| 2020/0244096 | A1* | 7/2020 | Tabuchi | ................. | H02M 3/158 |
| 2021/0098993 | A1* | 4/2021 | Shi | .......................... | H02M 1/00 |
| 2022/0200290 | A1 | 6/2022 | Zhang et al. | | |
| 2023/0308009 | A1* | 9/2023 | Yu | ........................ | H02M 7/493 |

FOREIGN PATENT DOCUMENTS

| | | | |
|---|---|---|---|
| CN | 113890103 | A | 1/2022 |
| DE | 10 2013 102 433 | A1 | 9/2013 |
| JP | S60-16174 | A | 1/1985 |
| JP | 2001169550 | A | 6/2001 |
| JP | 2003102131 | A | 4/2003 |
| JP | 2009201248 | A | 9/2009 |
| JP | 2017017868 | A | 1/2017 |
| JP | 2018-033226 | A | 3/2018 |
| KR | 2008-0030129 | A | 4/2008 |
| WO | WO 2021/208044 | A1 | 10/2021 |

OTHER PUBLICATIONS

Extended European Search Report for European Application No. 22888780.8, dated May 12, 2025.

International Search Report and Written Opinion for International Application No. PCT/CN2022/088674, mailed Jul. 4, 2022.

PCT/CN2022/088674, Jul. 4, 2022, International Search Report and Written Opinion.

* cited by examiner

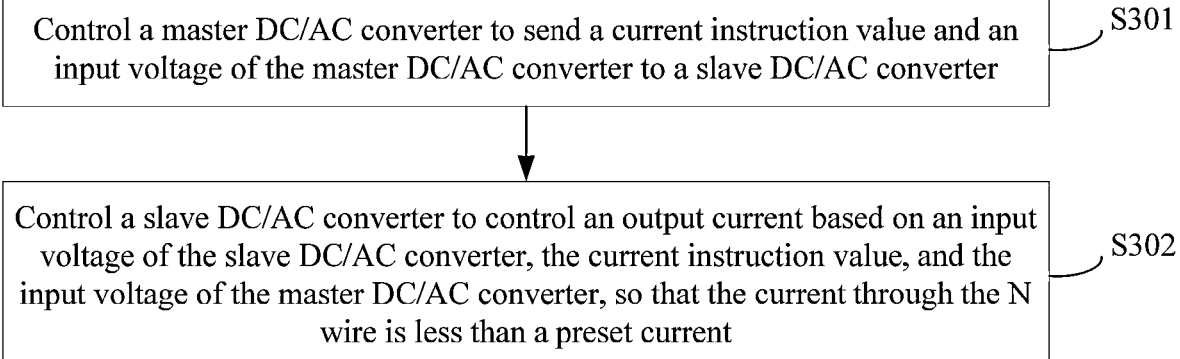

Control a master DC/AC converter to send a current instruction value and an input voltage of the master DC/AC converter to a slave DC/AC converter — S301

Control a slave DC/AC converter to control an output current based on an input voltage of the slave DC/AC converter, the current instruction value, and the input voltage of the master DC/AC converter, so that the current through the N wire is less than a preset current — S302

Figure 3

PHOTOVOLTAIC SYSTEM HAVING MASTER AND SLAVE CONVERTERS AND CONTROL METHOD OF THE SAME

This application is a national stage filing under 35 U.S.C. § 371 of International Patent Application Serial No. PCT/CN2022/088674, filed Apr. 24, 2022, which claims priority to Chinese Patent Application No. 202111308573.7, titled "PHOTOVOLTAIC SYSTEM AND CONTROL METHOD", filed on Nov. 5, 2021 with the China National Intellectual Property Administration. The contents of these applications are incorporated herein by reference in their entireties.

FIELD

The present disclosure relates to the technical field of photovoltaic power generation, and in particular to a photovoltaic system and a control method.

BACKGROUND

Currently, photovoltaic power generation is receiving increasing attention, and the voltage level involved is becoming higher. In photovoltaic power generation, direct current (DC) power is outputted by a photovoltaic array and then converted into alternating current (AC) power by an inverter. Subsequently, this AC power is either connected to the grid or supplied to a load.

The direct current bus in the conventional photovoltaic system includes a direct current positive bus and a direct current negative bus, i.e., a positive input terminal of an inverter is connected to the positive direct current bus, and a negative input terminal of the inverter is connected to the negative direct current bus. A voltage between the positive direct current bus and the negative direct current bus is used as an input voltage of the inverter. A voltage level of the entire photovoltaic system is the maximum voltage between the voltage at the positive direct current bus and the voltage at the negative direct current bus. Safety standard is also designed according to the voltage level.

To comply with the safety standard, the input voltage of the inverter, namely the direct current side voltage, must not exceed the requirement set by these standards. Exceeding the requirement can result in damage to both humans and devices, particularly the power devices inside the inverter. Each power device has a specific withstand voltage requirement, and any voltage exceeding the withstand voltage can lead to the breakdown and damage of the device. The increasing voltage level in photovoltaic system presents new challenges for the withstand voltage of these power devices, making their selection increasingly difficult.

A photovoltaic system, at present, exists with three direct current buses. The photovoltaic system includes two inverters, where an input terminal of a first inverter is connected to the positive direct current bus and an N wire, while the input terminal of a second inverter is connected to the N wire and the negative direct current bus. As a result, the voltage level is enhanced, yet the safety standard requirements for the inverters remain the same. However, to minimize the loss in the N wire, the current through the N wire is required to control to be as low as possible, or zero.

SUMMARY

In order to solve the above technical problems, a photovoltaic system and a control method for a photovoltaic system are provided in the present disclosure, which can control a current through an N wire to be low to reduce power consumption.

To this end, technical solutions are provided below according to embodiments of the present disclosure.

A photovoltaic system is provided according to the present disclosure, the photovoltaic system includes a master DC/DC converter, a slave DC/DC converter, a master DC/AC converter and a slave DC/AC converter;

where, an input terminal of the master DC/DC converter is configured to be connected to a photovoltaic array, a positive output terminal of the master DC/DC converter is connected to a positive input terminal of the master DC/AC converter, a negative output terminal of the master DC/DC converter is connected to an N wire, and a negative input terminal of the master DC/AC converter is connected to the N wire;

a negative input terminal of the slave DC/DC converter is connected to the negative output terminal of the master DC/DC converter, and a positive input terminal of the slave DC/DC converter is connected to the positive output terminal of the master DC/DC converter, a positive output terminal of the slave DC/DC converter is connected to the N wire, the negative output terminal of the slave DC/DC converter is connected to the negative output of the slave DC/AC converter, and a positive output terminal of the slave DC/AC converter is connected to the N wire;

the master DC/AC converter is configured to send a current instruction value and an input voltage of the master DC/AC converter to the slave DC/AC converter; and the slave DC/AC converter is configured to control an output current, based on an input voltage of the slave DC/AC converter, the current instruction value, and the input voltage of the master DC/AC converter, so that a current through the N wire is less than a preset current.

In an embodiment, the slave DC/AC converter is further configured to control the output current to be directly proportional to the input voltage of the slave DC/AC converter and the current instruction value, and inversely proportional to the input voltage of the master DC/AC converter, so that the current through the N wire is less than the preset current.

In an embodiment, the slave DC/AC converter is further configured to control the output current to be $U2 \cdot I1/U1$, where the $U2$ is the input voltage of the slave DC/AC converter, the $U1$ is the input voltage of the master DC/AC converter, and the $I1$ is the current instruction value.

In an embodiment, in a case that an output power of the master DC/AC converter is not limited by the master DC/AC converter, the input voltage of the master DC/AC converter is a preset value.

In an embodiment, in a case that an output power of the master DC/AC converter is limited by the master DC/AC converter, the master DC/AC converter is further configured to collect the input voltage of the master DC/AC converter and send the collected input voltage of the master DC/AC converter to the slave DC/AC converter; or the slave DC/AC converter is further configured to directly collect the input voltage of the master DC/AC converter.

In an embodiment, in a case that the photovoltaic system is not power-limited, and an abnormal communication between the master DC/AC converter and the slave DC/AC converter is detected by the slave DC/AC converter, the slave DC/AC converter is configured to obtain the current instruction value based on the input voltage of the master DC/AC converter, the current through the N wire, the input voltage of the slave DC/AC converter and an output power of the slave DC/AC converter, and control the output current of the slave DC/AC converter based on the current instruction value, so that the current through the N wire is less than the preset current.

In an embodiment, in a case that the photovoltaic system is power-limited, and the input voltage of the master DC/AC converter sent by the master DC/AC converter is not received by the slave DC/AC converter, the slave DC/AC converter is configured to obtain the current instruction value based on the input voltage of the master DC/AC converter, the current through the N wire, the input voltage of the slave DC/AC converter and an output power of the slave DC/AC converter, and control the output current of the slave DC/AC converter based on the current instruction value, so that the current through the N wire is less than the preset current.

In an embodiment, in a case that low voltage ride through or high voltage ride through occurs in the photovoltaic system, the master DC/AC converter is configured to control the master DC/AC converter to output a first reactive power and control the slave DC/AC converter to output a second reactive power.

According to the present disclosure, a control method for a photovoltaic system is further provided. The photovoltaic system includes a master DC/DC converter, a slave DC/DC converter, a master DC/AC converter and a slave DC/AC converter. where, an input terminal of the master DC/DC converter is configured to be connected to a photovoltaic array, a positive output terminal of the master DC/DC converter is connected to a positive input terminal of the master DC/AC converter, a negative output terminal of the master DC/DC converter is connected to an N wire, and a negative input terminal of the master DC/AC converter is connected to the N wire; a negative input terminal of the slave DC/DC converter is connected to the negative output terminal of the master DC/DC converter, and a positive input terminal of the slave DC/DC converter is connected to the positive output terminal of the master DC/DC converter, a positive output terminal of the slave DC/DC converter is connected to the N wire, the negative output terminal of the slave DC/DC converter is connected to the negative output of the slave DC/AC converter, and a positive output terminal of the slave DC/AC converter is connected to the N wire; where the control method includes: controlling the master DC/AC converter to send a current instruction value and an input voltage of the master DC/AC converter to the slave DC/AC converter; and controlling the slave DC/AC converter to control an output current, based on an input voltage of the slave DC/AC converter, the current instruction value, and the input voltage of the master DC/AC converter, so that a current through the N wire is less than a preset current.

In an embodiment, the controlling the output current, based on the input voltage of the slave DC/AC converter, the current instruction value, and the input voltage of the master DC/AC converter, further includes:

controlling the output current to be directly proportional to the input voltage of the slave DC/AC converter and the current instruction value, and inversely proportional to the input voltage of the master DC/AC converter, so that the current through the N wire is less than the preset current.

In an embodiment, the control method further includes: controlling the input voltage of the master DC/AC converter to be a preset value, in a case that an output power of the master DC/AC converter is not limited by the master DC/AC converter.

In an embodiment, the control method further includes: in a case that an output power of the master DC/AC converter is limited by the master DC/AC converter, collecting, by the master DC/AC converter, the input voltage of the master DC/AC converter, and sending, by the master DC/AC converter, the collected input voltage of the master DC/AC converter to the slave DC/AC converter.

In an embodiment, in a case that the photovoltaic system is not power-limited, the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further includes:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

In an embodiment, in a case that the photovoltaic system is power-limited, and the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further includes:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

Based on the above technical solutions, the present disclosure has beneficial effects as follows.

In order to enable the current through the N wire to be extremely small and even to be zero, the output power of the master DC/AC converter and the output power of the slave DC/AC converter are required to be equal, and the output power of the slave DC/AC converter follows the output power of the master DC/AC converter. If ignoring power consumption, the output power of the master DC/AC converter is equal to its input power, the output power of the slave DC/AC converter is equal to its input power, the input power of the master DC/AC converter is equal to the input power of the slave DC/AC converter. Therefore, the current through the N wire can be controlled to be less than the preset current by controlling the output power of the master DC/AC converter to be equal to the output power of the slave DC/AC converter. Specifically, the master DC/AC converter sends the current instruction value and the input voltage of the master DC/AC converter to the slave DC/AC converter. Based on the input voltage of the slave DC/AC converter, the current instruction value and the input voltage of the master DC/AC converter, the slave DC/AC converter controls the output current, so that the current through the N wire is less than the preset current. The smaller the current through the N wire, the lower the power consumption of N wire. For example, the current through the N wire can be controlled to be minimized to zero.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional technology. Apparently, the drawings in the following descriptions are only some embodiments of the present disclosure, and those skilled in the art can obtain other drawings from these drawings without any creative effort.

FIG. 3 is a flowchart of a control method for a photovoltaic system according to an embodiment of the present disclosure.

DETAILED DESCRIPTION

To facilitate a better understanding of the scheme provided in embodiments of the present disclosure, before introducing the method provided in the embodiments of the present disclosure, the application scenario of the embodiments of the present disclosure is introduced first.

System Embodiment

Figure 1:
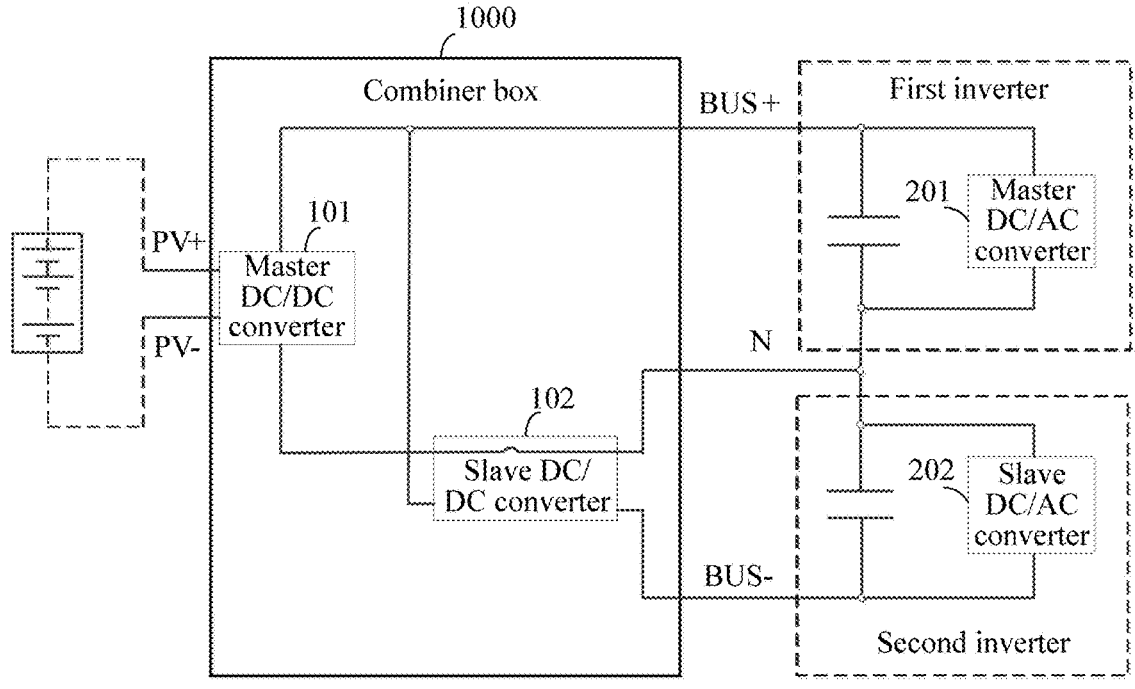
FIG. 1 is a schematic diagram of a photovoltaic system according to an embodiment of the present disclosure.
Figure 2:
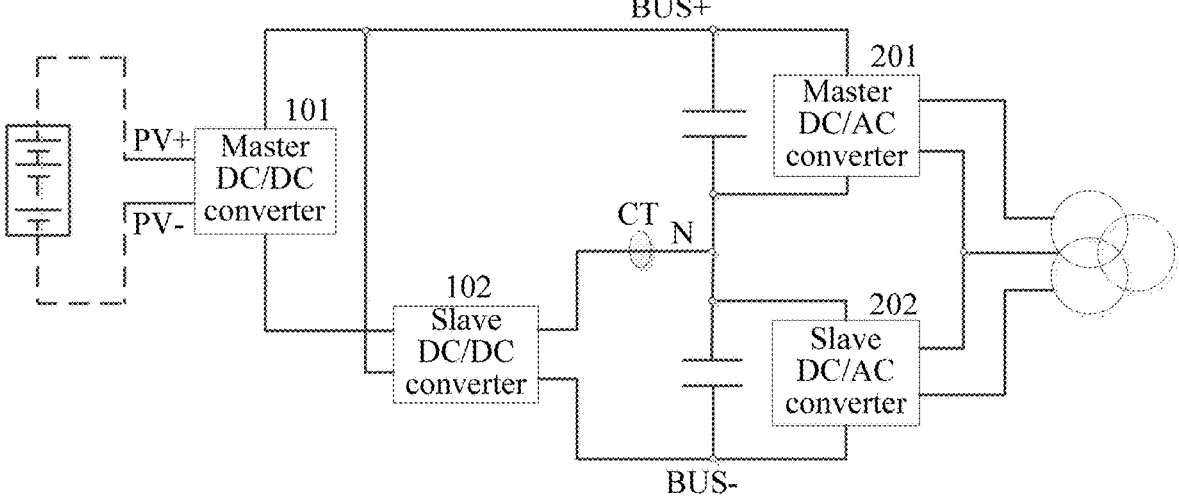
FIG. 2 is a schematic diagram of a photovoltaic system according to another embodiment of the present disclosure.

Referring to FIG. 1, FIG. 1 is a schematic diagram of a photovoltaic system according to an embodiment of the present disclosure.

In this embodiment, the photovoltaic system includes two direct current/direct current (DC/DC) converters and two inverters. The two inverters are respectively a first inverter and a second inverter. Where, each inverter includes a direct current/alternating current (DC/AC) converter.

Where, the two DC/DC converters are respectively a master DC/DC converter 101 and a slave DC/DC converter 102. And, the two DC/AC converters are respectively a master DC/AC converter 201 and a slave DC/AC converter 202.

Where, the two DC/DC converters are integrated in a combiner box 1000. The input terminal of the combiner box 1000 is connected to a photovoltaic array. Whether a combiner box is included in the photovoltaic system or not is not limited in the embodiment of the present disclosure. When the combiner box is not included, the two DC/DC converters may exist independently.

The photovoltaic system provided in the present disclosure differs in that there are three buses included, i.e., a direct current positive bus BUS+, a direct current negative bus BUS− and an N wire. In contrast, the conventional photovoltaic system includes only two buses, i.e., BUS+ and BUS−. The photovoltaic system provided in the present disclosure including three buses has following advantages. A voltage level is doubled without increasing the withstanding voltage of each device in the converter. In other words, devices in photovoltaic system with two buses, such as IGBTs, can still be used. For example, the voltage of BUS+ is positive 1500V, the voltage of BUS− is negative 1500V, and the voltage level of the entire photovoltaic system is 3000V.

As shown in FIG. 1, the input terminal of the master DC/DC converter 101 is configured to be connected to the photovoltaic array. Where, the positive input terminal of the master DC/DC converter 101 is used to be connected to the positive electrode PV+ of the photovoltaic array, and the negative input terminal of the master DC/DC converter 101 is used to be connected to the negative electrode PV− of the photovoltaic array.

The quantity of master DC/DC converters 101 is not limited in the embodiments of the present disclosure. FIG. 1 is only a schematic illustration of the connection relationship between the master DC/DC converter 101 and the photovoltaic array. It should be understood that the photovoltaic system provided in the embodiments of the present disclosure may include multiple master DC/DC converters 101. The input terminal of each master DC/DC converter 101 is connected to a corresponding photovoltaic array, and the output terminals of the multiple master DC/DC converters 101 are connected in parallel.

The positive output terminal of the master DC/DC converter 101 is connected to the positive input terminal of the master DC/AC converter 201, the negative output terminal of the master DC/DC converter 101 is connected to the N wire, and the negative input terminal of the master DC/AC converter 201 is connected to the N wire.

The negative input terminal of the slave DC/DC converter 102 is connected to the negative output terminal of the master DC/DC converter 101, and the positive input terminal of the slave DC/DC 102 converter is connected to the positive output terminal of the master DC/DC converter 101. The positive output terminal of the slave DC/DC converter 102 is connected to the N wire, the negative output terminal of the slave DC/DC converter 102 is connected to the negative output terminal of the slave DC/AC converter 202, and the positive output terminal of the slave DC/AC converter 202 is connected to the N wire. Similarly, the quantity of the slave DC/DC converters 102 is not limited in the embodiments of the present disclosure, the quantity of the slave DC/DC converters may be one or more. When the quantity of the slave DC/DC converters 102 is more than one, the output terminals of the multiple slave DC/DC converters 102 are connected in parallel.

Since the photovoltaic system includes the N wire, for a thinner N wire, the current through the N wire is controlled as low as possible, i.e., a limit current of N wire is less than a preset current. The preset current may be set according to actual requirement, such as controlling the current in N wire to be zero, that is, no current flows through the N wire, which results in the lowest power consumption. However, in practice, various errors generally exist, leading the preset current may be a relatively small current yet greater than zero. The smaller the current through the N wire, the thinner the N wire can be, resulting in lower power consumption.

According to an embodiment of the present disclosure, a solution for controlling the current through the N wire to be zero is provided. First, the output power of the slave DC/DC converter 102 is configured to be half of the output power of the master DC/DC converter 101. As shown in FIG. 1, the input power of the slave DC/AC converter 202 is the output power of the slave DC/DC converter 102. When the input power of the master DC/AC converter 201 is equal to the input power of the slave DC/AC converter 202, the current through the N wire is zero. Since the sum of the input power of the two inverters comes from the output power of the master DC/DC converter 101, if ignoring the power consumption, the output power of the master DC/DC converter 101 is twice as much as the input power of the slave DC/AC converter 202. Since the input power of the slave DC/AC converter 202 is equal to the output power of the slave DC/DC converter 102, the output power of the slave DC/DC converter 102 is half of the output power of the master DC/DC converter 101.

Circuit topology of the DC/DC converters of the master DC/DC converter 101 and the slave DC/DC converter 102 is not limited in the embodiment of the present disclosure. For example, in order to improve the power conversion efficiency of the combiner box, a quasi-resonant soft switching converter may be used as the slave DC/DC converter 102.

As maximum power point tracking (MPPT) and fast response under operation conditions such as transient state is required in the inverter, high requirements are put forward for controlling the response speed and reliability of the slave DC/DC converter 102. According to the present disclosure, the power control of the slave DC/DC converter 102 in the combiner box is simplified. The power of the slave DC/DC converter 102 can be controlled fast by the voltage difference between the input voltage and the output voltage of the slave DC/DC converter 102 through a post-level inverter. The slave DC/DC converter 102 can be controlled with constant frequency and constant duty ratio, to reduce the control complexity of the photovoltaic system to the most extent. In addition, the current flows through the neutral wire (N wire) can be less than the preset current or extremely small, and the diameter of the neutral wire is reduced, i.e., the neutral wire can be extremely thin, thereby reducing the construction cost of the entire photovoltaic power station.

In order to reduce the control complexity, according to the present disclosure, the master DC/AC converter 201 is configured to implement the entire control to enable the current through N wire to be zero. Specific operation principle is described in detail in conjunction with the drawings.

It should be understood that, both the master DC/AC converter 201 and the slave DC/AC converter 202 are provided with controllers. In specific operation, the controller of the master DC/AC converter 201 and the controller of the slave DC/AC converter 202 interact with each other to enable the master DC/AC converter 201 to control the slave DC/AC converter 202. In order to implement the current through the N wire less than the preset current, the output power of the master DC/AC converter 201 and the output power of the slave DC/AC converter 202 is required to be equal. While controlling through the master DC/AC converter 201, the output power of the slave DC/AC converter 202 follows the output power of the master DC/AC converter 201. If power consumption is ignored, the output power of the master DC/AC converter 201 is equal to the input power of the master DC/AC converter 201, the output power of the slave DC/AC converter 202 is equal to the input power of the slave DC/AC converter 202. In other words, in a case that the output power of the master DC/AC converter 201 is equal to the output power of the slave DC/AC converter 202, the input power of the master DC/AC converter 201 is equal to the input power of the slave DC/AC converter 202. Therefore, the current through the N wire can be controlled to be less than the preset current by controlling the output power of the master DC/AC converter 201 to be equal to the output power of the slave DC/AC converter 202.

The master DC/AC converter 201 is configured to send a current instruction value I1 and an input voltage U1 of the master DC/AC converter 201 to the slave DC/AC converter 202. In a case of a normal operation mode, i.e., the photovoltaic system does not perform power-limited output. In this case, to perform MPPT, U1 is a preset value, I1 is a value obtained based on U1.

The slave DC/AC converter 202 is configured to control an output current I2 of the slave converter 202, based on the current instruction value I1, an input voltage U2 of the slave DC/AC converter 202, and the input voltage U1 of the master DC/AC converter 201, so that the current through the N wire is less than a preset current.

U2 is an actual input voltage of the slave DC/AC converter 202, the U2 may be obtained by sampling.

In an embodiment, the slave DC/AC converter 202 is configured to control the output current to be directly proportional to the input voltage U2 of the slave DC/AC converter 202 and current instruction value I1, and inversely proportional to the input voltage U1 of the master DC/AC converter 201, so that the current through the N wire is less than the preset current.

In an embodiment, the slave DC/AC converter 202 is configured to control the output current of the slave DC/AC converter 202 to be U2*I1/U1. Where, U2 is the input voltage of the slave DC/AC converter 202, U1 is the input voltage of the master DC/AC converter 201, and I1 is the current instruction value.

The principle is described below, in which the current through the N wire is 0 when the output current of the slave DC/AC converter 202 is U2*I1/U1.

Information interaction is performed between the master DC/AC converter 201 and the slave DC/AC converter 202. When the power is not limited in the master DC/AC converter 201, the output power of the master DC/AC converter 201 is P1, the input voltage of the master DC/AC converter 201 is controlled to be U1. In this case, the current instruction value I1 is sent to the slave DC/AC converter 202 by the master DC/AC converter 201, the current instruction value I1 of the master DC/AC converter 201 is received by the slave DC/AC converter 202, and the output current of the slave DC/AC converter 202 is controlled to be equal to I1. Where, the input voltage of the slave DC/AC converter 202 is in an uncontrolled state, for example, the voltage value is U2, and U2<U1. The input voltage of the master DC/DC converter 101 is controlled to be V1 by the master DC/DC converter 101, and V1 is a voltage corresponding to the maximum power point of the photovoltaic array. A small current flows through the N wire (the value of the current is represented by $$I_N = \frac{P1(U2 - U1)}{U1U2}).$$

When the output current of the slave DC/AC converter 202 is controlled to be $$\frac{U2}{U1}*I1$$

by the slave DC/AC converter 202, the current through the N wire is less than the preset current.

The derivation of the above equation is described below. Current flows through the BUS+ is represented by $$I_+ = \frac{P1}{U1},$$

the output current of the master DC/AC converter 201 and the output current of the slave DC/AC converter 202 are controlled to be I1, the power of the master DC/AC converter 201 and the power of the slave DC/AC converter 202 are both P1. Current flows through the BUS– is represented by $$I_- = \frac{P1}{U2}.$$

The current $I_N$ of the N wire is the current flows through the BUS+ minus the current flows through the BUS–, thus the IN is represented by $$I_N = \frac{P1(U_2 - U_1)}{U_1 U_2}.$$

In a case that the current through the N wire is controlled to be zero, i.e., $$I_N = \frac{P1}{U1} - \frac{P2}{U2} = 0,$$

as $U_2 < U_1$, the power of the master DC/AC converter 201 is controlled to be greater than the power of the slave DC/AC converter 202, i.e., P1>P2. Based on the alternating side power, it can be obtained that $P1=U_{ac}*I_1$, $P2=U_{ac}*I_2$, which is substituted into the above equation to obtain $$I_2 = \frac{U_2}{U_1} * I_1,$$

where the $U_{AC}$ is an alternating output voltage.

Described above is a control mode of current through the N wire when the photovoltaic system is not power-limited. Hereinafter, a control mode, in which a zero current of N wire is implemented when output power is limited in the photovoltaic system, is provided. As an example, in the photovoltaic system, the master DC/AC converter controls the operation of the slave DC/AC converter as follows.

The difference between the power-limited photovoltaic system and the power-unlimited photovoltaic system is that: the inverter cannot output a power tracking by the maximum power when the power is limited, instead, the inverter outputs power according to a power instruction issued by the photovoltaic power station, i.e., the output power is less than or equal to the limit power. In this case, the input voltage of the master DC/AC converter is not a preset value, i.e., the input voltage of the master DC/AC converter is not controlled by the master DC/AC converter. For example, the output power of the master DC/AC converter is P2 when the power is limited. In order to distinguish from parameters when the power is not limited, the input voltage of the master DC/AC converter is U3 when the power is limited. The current instruction value sent by the master DC/AC converter to the slave DC/AC converter is I2, and the current instruction sent by the master DC/AC converter is received by the slave DC/AC converter, and the output current of the slave DC/AC converter is controlled to be I2. In this case, the input voltage of the slave DC/AC converter is in an uncontrolled state, where the input voltage of the slave DC/AC converter is represented by U4, and U4 is less than U3. The output power of the master DC/DC converter is controlled to be V2 by the master DC/DC converter, the V2 is not equal to the voltage V1 corresponding to the maximum power point of the photovoltaic array. The current through N wire is $$I_N = \frac{P2(U_4 - U_3)}{U_3 U_4}.$$

When the output current of the slave DC/AC converter is controlled by the slave DC/AC converter to be $$\frac{U_3}{U_4} * I_2,$$

the current through the N wire is less than the preset current. In other words, when the power is limited, the output current of the slave DC/AC converter may still be controlled to be a value obtained through multiplying the input voltage of the master DC/AC converter by the current instruction value and then being divided by the input voltage of the slave DC/AC converter. In this case, only specific parameter values changes compared with the specific parameter values in a case that the power is not limited. For example, when the power is not limited, the input voltage of the master DC/AC converter is the preset value U1. While the output power of the master DC/AC converter is limited by the master DC/AC converter, the input voltage of the master DC/AC converter is not controlled, the input voltage of the master DC/AC converter is collected by the master DC/AC converter and is sent to the slave DC/AC converter. In addition, the input voltage of the master DC/AC converter may also be collected by the slave DC/AC converter directly. The derivation process of the output current of the slave DC/AC converter in power-limited control is similar to the above derivation process of power-unlimited control, which can refer to the above derivation process and will not be repeated here.

The control of the master DC/AC converter to the slave DC/AC converter is described above, but in actual operation, the communication between the master DC/AC converter and the slave DC/AC converter may malfunction. Hence, the special operation conditions are described below, i.e., a control mode where the communication between the master DC/AC converter and the slave DC/AC converter is abnormal or fail.

Due to the communication malfunction between the master DC/AC converter and the slave DC/AC converter, i.e., the communication is abnormal, the master DC/AC converter is unable to send the current instruction value and the input voltage of the master DC/AC converter to the slave DC/AC converter. In other words, the slave DC/AC converter does not receive the current instruction value and the input voltage of the master DC/AC converter sent by the master DC/AC converter. In this case, the slave DC/AC converter has to acquire the current instruction value and the input voltage of the master DC/AC converter. For example, the input voltage of the master DC/AC converter may be collected. In addition, the slave DC/AC converter may collect the current IN of the N wire. The slave DC/AC converter may also collect the input voltage of the slave DC/AC converter itself. In other words, the slave DC/AC converter may control the output current of the slave DC/AC converter itself, based on the input voltage of the slave DC/AC converter, the input voltage of the master DC/AC converter and the current through the N wire, that is, the current instruction value is obtained. In a case that the photovoltaic system is not power-limited, the slave DC/AC converter detects an abnormal communication with the master DC/AC converter. For example, in a case that the input voltage of the master DC/AC converter sent by the master DC/AC converter is not received, based on the input voltage of the master DC/AC converter, the current through the N wire, and the input voltage of the slave DC/AC converter, the slave DC/AC converter obtains the current instruction value. Subsequently, the output current of the slave DC/AC converter is controlled based on the current instruction value, so that the current through the N wire is less than the preset current.

In order to distinguish from the case where the master DC/AC converter communicates normally with the slave DC/AC converter, the following parameters use different reference signs from the parameters in the embodiments above. In a case that the power is not limited, the master DC/AC converter controls the input voltage of the master DC/AC converter to be U5. The slave DC/AC converter may collect the current IN of the N wire and the input voltage U5 of the master DC/AC converter. Where, the output power of the slave DC/AC converter is P3, and the input voltage of the slave DC/AC converter is U6, and U6 is less than U5. In this case, based on the IN, the power control instruction P3' of the slave DC/AC converter obtained by the slave DC/AC converter is $$P3' = \frac{U5}{U6}P3 - U5 * I_N.$$

Based on the power control instruction P3', the current instruction value I1' obtained by the slave DC/AC converter is $$I1' = \frac{P3'}{3 * U_{AC}},$$

where the $U_{AC}$ is an alternating output voltage. Since each converter has three phases, the power is the sum of the power of three phases. Therefore, when the current is obtained based on the power and the voltage, the current instruction value for each phase is obtained through the current divided by 3.

Described hereinafter is a process of obtaining the power control instruction of the slave DC/AC converter by the slave DC/AC converter based on the IN. Since the power of the slave DC/AC converter follows the power of the master DC/AC converter, the process of obtaining the power of the master DC/AC converter is provided first, and the power of the slave DC/AC converter is equal to the power of the master DC/AC converter.

$$U_5 * I_+ = P_{master}, U_6 * I_- = P_3, I_N = I_+ - I_-.$$

It can be obtained from the above three equations:

$$P_{master} = U_5(\frac{P_3}{U_6} - I_N).$$

Therefore, the power of the slave DC/AC converter is represented by $$P3' = \frac{U5}{U6}P3 - U5 * I_N.$$

Described above is the control mode when the communication between the master DC/AC converter and the slave DC/AC converter is abnormal and the power is not limited. Hereinafter, a control mode is described, in which the communication between the master DC/AC converter and the slave DC/AC converter is abnormal and the power is limited.

It should be understood that when the communication between the two inverters is abnormal, the control mode of the slave DC/AC converter remains the same, i.e., the current $I_N$ of the N wire and the input voltage U7 of the master DC/AC converter are collected, as well as the input voltage U8 is collected.

When the power is limited by the master DC/AC converter, for example, the output power is limited to be P2, and the input voltage of the master DC/AC converter is U7. In this case, the current $I_N$ of the N wire is collected by the slave DC/AC converter, the output power of the slave DC/AC converter is P4, the input voltage of the slave DC/AC converter is U8, where U7 is less than U8. The control instruction P4' of the output power of the slave DC/AC converter is obtained by the slave DC/AC converter based on the collected current through the N wire:

$$P4' = \frac{U7}{U8}P4 - U7 * I_N.$$

The current instruction value is obtained by the slave DC/AC converter based on the power control instruction P43 and is represented by $$I1' = \frac{P4'}{3 * U_{AC}},$$

where, the $U_{AC}$ is the alternating output voltage. Since each converter has three phases, the power is the sum of the power of three phases. Therefore, when the current is obtained based on the power and the voltage, the current instruction value for each phase is obtained through the current divided by 3. It should be understood that, when the power is limited, the control mode is similar to the above description of unlimited power, and the derivation process of the equations is referred to the above description, which will not be repeated here.

Another special operation condition of the photovoltaic system is described hereinafter. In a case that low voltage ride through or high voltage ride through occurs in the grid, since it is required a compensation of a reactive power for the grid, the inverter is required to output a reactive power. For example, the master DC/AC converter outputs a first reactive power Q1, and the slave DC/AC converter outputs a second reactive power Q2. As the output of reactive power does not affect the value of the current through the N wire, the two inverters can allocate the value of reactive power arbitrarily. In an embodiment, Q1 may be equal to Q2, or not equal to Q2. For example, one of the inverters may bear all the reactive power. Where, the required reactive current may be obtained based on the reactive power needs to be borne. In one implementation, the master DC/AC converter outputs a reactive power, and the slave DC/AC converter may not output a reactive power. In reactive power compensation, the master DC/AC converter arbitrarily allocates the value of reactive current that needs to be borne by the slave DC/AC converter.

In addition, the control of reactive power by the two inverters is also applicable to other operation scenarios, which is not limited to the above voltage ride through scenario.

Based on the photovoltaic system provided in the embodiments above, a control method for the photovoltaic system is provided in the present disclosure, the control method is described in detail hereinafter in conjunction with the drawings.

Method Embodiment

Referring to FIG. 3, FIG. 3 is a flow chart of a control method for a photovoltaic system according to an embodiment of the present disclosure.

The control method for the photovoltaic system provided in the embodiment is applied to the photovoltaic system. The photovoltaic system includes: a master DC/DC converter, a slave DC/DC converter, a master DC/AC converter and a slave DC/AC converter. An input terminal of the master DC/DC converter is configured to be connected to the photovoltaic array; a positive output terminal of the master DC/DC converter is connected to a positive input terminal of the master DC/AC converter, a negative output terminal of the master DC/DC converter is connected to an N wire, and a negative input terminal of the master DC/AC converter is connected to the N wire. A negative input terminal of the slave DC/DC converter is connected to the negative output terminal of the master DC/DC converter, and a positive input terminal of the slave DC/DC converter is connected to the positive output terminal of the master DC/DC converter. A positive output terminal of the slave DC/DC converter is connected to the N wire, a negative output terminal of the slave DC/DC converter is connected to a negative output of the slave DC/AC converter, and the positive output terminal of the slave DC/AC converter is connected to the N wire.

The method includes steps S301 to S302 as follows.

In step S301, the master DC/AC converter is controlled to send a current instruction value and the input voltage of the master DC/AC converter to the slave DC/AC converter.

In step S302, the slave DC/AC converter is controlled to control an output current based on the input voltage of the slave DC/AC converter, the current instruction value, and the input voltage of the master DC/AC converter, so that the current through the N wire is less than a preset current.

Both the master DC/AC converter 201 and the slave DC/AC converter 202 are provided with controllers. When in use, the controller of the master DC/AC converter 201 and the controller of the slave DC/AC converter 202 interact with each other to enable the master DC/AC converter 201 to control the slave DC/AC converter 202. In order to enable the current through the N wire to be less than the preset current, the output power of the master DC/AC converter 201 and the output power of the slave DC/AC converter 202 are required to be equal. While being controlled by the master DC/AC converter 201, the output power of the slave DC/AC converter 202 follows the output power of the master DC/AC converter 201. If power consumption is ignored, the output power of the master DC/AC converter 201 is equal to its input power, and the output power of the slave DC/AC converter 202 is equal to its input power. In other words, in a case that the output power of the master DC/AC converter 201 is equal to the output power of the slave DC/AC converter 202, the input power of the master DC/AC converter 201 is equal to the input power of the slave DC/AC converter 202. Therefore, the current through the N wire may be controlled to be zero by controlling the output power of the master DC/AC converter 201 to be equal to the output power of the slave DC/AC converter 202.

In order to enable the current through the N wire to be less that the preset current, the output power of the master DC/AC converter and the output power of the slave DC/AC converter are required to be equal. The output power of the slave DC/AC converter follows the output power of the master DC/AC converter. In an embodiment, the master DC/AC converter sends the current instruction value and the input voltage of the master DC/AC converter to the slave DC/AC converter. Based on the input voltage of the slave DC/AC converter, the current instruction value and the input voltage of the master DC/AC converter, the slave DC/AC converter controls the output current, so that the current through the N wire is less than the preset current. When the current through the N wire is less than the preset current, the power consumption of N wire is reduced.

In an embodiment, based on the input voltage of the slave DC/AC converter, the current instruction value and the input voltage of the master DC/AC converter, the output current is controlled, further includes:

controlling the output current to be directly proportional to the input voltage of the slave DC/AC converter and the current instruction value, and inversely proportional to the input voltage of the master DC/AC converter, so that the current through the N wire is less than the preset current.

In addition, when the output power of the master DC/AC converter is not limited by the master DC/AC converter, the control method provided in this embodiment further includes: controlling the input voltage of the master DC/AC converter to be a preset value.

In a case that the output power of the master DC/AC converter is limited by the master DC/AC converter, the control method provided in this embodiment further includes: collecting the input voltage of the master DC/AC converter by the master DC/AC converter, and sending the collected input voltage of the master DC/AC converter to the slave DC/AC converter.

When the photovoltaic system is not power-limited, the input voltage of the master DC/AC converter sent by the master DC/AC converter is not received by the slave DC/AC converter, the controlling the output current based on the input voltage of the slave DC/AC converter, the current instruction value and the input voltage of the master DC/AC converter, so that the current through the N wire is less than the preset current, further includes:

based on the input voltage of the master DC/AC converter, the current through the N wire, the input voltage of the slave DC/AC converter and the output power of the slave DC/AC converter, obtaining the current instruction value; controlling the output current of the slave DC/AC converter based on the current instruction value, so that the current through the N wire is less than the preset current.

When the photovoltaic system is power-limited, the input voltage of the master DC/AC converter sent by the master DC/AC converter is not received by the slave DC/AC converter, the controlling the output current based on the input voltage of the slave DC/AC converter, the current instruction value and the input voltage of the master DC/AC converter, so that the current through the N wire is less than the preset current, further includes:

based on the input voltage of the master DC/AC converter, the current through the N wire, the input voltage of the slave DC/AC converter and the output power of the slave DC/AC converter, obtaining the current instruction value; controlling the output current of the slave DC/AC converter based on the current instruction value, so that the current through the N wire is less than the preset current.

It should be noted that, the terms "include", "comprise" or any variant thereof are intended to indicate nonexclusive inclusion so that a process, method, article or device including a series of elements includes not only those explicitly described elements but also other elements which have not been listed explicitly or an element(s) inherent to the process, method, article or device. Unless expressively limited, the statement "including a . . . " does not exclude the case that other similar elements may exist in the process, method, article or device including the series of elements.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but conforms to a widest scope in accordance with principles and novel features disclosed in the present disclosure.

The invention claimed is:

1. A photovoltaic system, comprising:
a master DC/DC converter;
a slave DC/DC converter;
a master DC/AC converter; and
a slave DC/AC converter; wherein
an input terminal of the master DC/DC converter is configured to be connected to a photovoltaic array, a positive output terminal of the master DC/DC converter is connected to a positive input terminal of the master DC/AC converter, a negative output terminal of the master DC/DC converter is connected to an N wire, and a negative input terminal of the master DC/AC converter is connected to the N wire;
a negative input terminal of the slave DC/DC converter is connected to the negative output terminal of the master DC/DC converter, and a positive input terminal of the slave DC/DC converter is connected to the positive output terminal of the master DC/DC converter, a positive output terminal of the slave DC/DC converter is connected to the N wire, a negative output terminal of the slave DC/DC converter is connected to a negative output of the slave DC/AC converter, and a positive output terminal of the slave DC/AC converter is connected to the N wire;

the master DC/AC converter is configured to send a current instruction value and an input voltage of the master DC/AC converter to the slave DC/AC converter; and the slave DC/AC converter is configured to control an output current, based on an input voltage of the slave DC/AC converter, the current instruction value, and the input voltage of the master DC/AC converter, so that a current through the N wire is less than a preset current.

2. The photovoltaic system according to claim 1, wherein the slave DC/AC converter is further configured to control the output current to be directly proportional to the input voltage of the slave DC/AC converter and the current instruction value, and inversely proportional to the input voltage of the master DC/AC converter, so that the current through the N wire is less than the preset current.

3. The photovoltaic system according to claim 2, wherein the slave DC/AC converter is further configured to control the output current to be $U2*I1/U1$, where the $U2$ is the input voltage of the slave DC/AC converter, the $U1$ is the input voltage of the master DC/AC converter, and the $I1$ is the current instruction value.

4. The photovoltaic system according to claim 1, wherein, in a case that an output power of the master DC/AC converter is not limited by the master DC/AC converter, the input voltage of the master DC/AC converter is a preset value.

5. The photovoltaic system according to claim 1, wherein, in a case that an output power of the master DC/AC converter is limited by the master DC/AC converter, the master DC/AC converter is further configured to collect the input voltage of the master DC/AC converter and send the collected input voltage of the master DC/AC converter to the slave DC/AC converter; or the slave DC/AC converter is further configured to directly collect the input voltage of the master DC/AC converter.

6. The photovoltaic system according to claim 1, wherein, in a case that the photovoltaic system is not power-limited, and an abnormal communication between the master DC/AC converter and the slave DC/AC converter is detected by the slave DC/AC converter, the slave DC/AC converter is configured to obtain the current instruction value based on the input voltage of the master DC/AC converter, the current through the N wire, the input voltage of the slave DC/AC converter and an output power of the slave DC/AC converter, and control the output current of the slave DC/AC converter based on the current instruction value, so that the current through the N wire is less than the preset current.

7. The photovoltaic system according to claim 1, wherein, in a case that the photovoltaic system is power-limited, and the input voltage of the master DC/AC converter sent by the master DC/AC converter is not received by the slave DC/AC converter, the slave DC/AC converter is configured to obtain the current instruction value based on the input voltage of the master DC/AC converter, the current through the N wire, the input voltage of the slave DC/AC converter and an output power of the slave DC/AC converter, and control the output current of the slave DC/AC converter based on the current instruction value, so that the current through the N wire is less than the preset current.

8. The photovoltaic system according to claim 1, wherein, in a case that low voltage ride through or high voltage ride through occurs in the photovoltaic system, the master DC/AC converter is configured to control the master DC/AC converter to output a first reactive power and control the slave DC/AC converter to output a second reactive power.

9. A control method for a photovoltaic system, wherein the photovoltaic system comprises a master DC/DC converter, a slave DC/DC converter, a master DC/AC converter and a slave DC/AC converter; wherein an input terminal of the master DC/DC converter is configured to be connected to a photovoltaic array, a positive output terminal of the master DC/DC converter is connected to a positive input terminal of the master DC/AC converter, a negative output terminal of the master DC/DC converter is connected to an N wire, and a negative input terminal of the master DC/AC converter is connected to the N wire; a negative input terminal of the slave DC/DC converter is connected to the negative output terminal of the master DC/DC converter, and a positive input terminal of the slave DC/DC converter is connected to the positive output terminal of the master DC/DC converter, a positive output terminal of the slave DC/DC converter is connected to the N wire, a negative output terminal of the slave DC/DC converter is connected to a negative output of the slave DC/AC converter, and a positive output terminal of the slave DC/AC converter is connected to the N wire;

wherein the control method comprises:

controlling the master DC/AC converter to send a current instruction value and an input voltage of the master DC/AC converter to the slave DC/AC converter; and controlling the slave DC/AC converter to control an output current, based on an input voltage of the slave DC/AC converter, the current instruction value, and the input voltage of the master DC/AC converter, so that a current through the N wire is less than a preset current.

10. The control method according to claim 9, the controlling the output current, based on the input voltage of the slave DC/AC converter, the current instruction value, and the input voltage of the master DC/AC converter, further comprises:

controlling the output current to be directly proportional to the input voltage of the slave DC/AC converter and the current instruction value, and inversely proportional to the input voltage of the master DC/AC converter, so that the current through the N wire is less than the preset current.

11. The control method according to claim 10, wherein, in a case that the photovoltaic system is not power-limited, the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

12. The control method according to claim 10, wherein, in a case that the photovoltaic system is power-limited, and the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

13. The control method according to claim 9, the control method further comprises:

controlling the input voltage of the master DC/AC converter to be a preset value, in a case that an output power of the master DC/AC converter is not limited by the master DC/AC converter.

14. The control method according to claim 13, wherein, in a case that the photovoltaic system is not power-limited, the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

15. The control method according to claim 13, wherein, in a case that the photovoltaic system is power-limited, and the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

16. The control method according to claim 9, wherein the control method further comprises:

in a case that an output power of the master DC/AC converter is limited by the master DC/AC converter, collecting, by the master DC/AC converter, the input voltage of the master DC/AC converter, and sending, by the master DC/AC converter, the collected input voltage of the master DC/AC converter to the slave DC/AC converter.

17. The control method according to claim 16, wherein, in a case that the photovoltaic system is not power-limited, the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

18. The control method according to claim 16, wherein, in a case that the photovoltaic system is power-limited, and the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

19. The control method according to claim 9, wherein, in a case that the photovoltaic system is not power-limited, the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

20. The control method according to claim 9, wherein, in a case that the photovoltaic system is power-limited, and the input voltage of the master DC/AC converter sent by the master DC/AC converter is not received by the slave DC/AC converter, the controlling the output current, based on the input voltage of the slave DC/AC converter, the current instruction value, and the input voltage of the master DC/AC converter, so that the current through the N wire is less than the preset current, further comprises:

obtaining the current instruction value, based on the input voltage of the master DC/AC converter, the current through the N wire, the input voltage of the slave DC/AC converter and an output power of the slave DC/AC converter, and controlling the output current of the slave DC/AC converter based on the current instruction value, so that the current through the N wire is less than the preset current.

* * * * *